(12) United States Patent
Chiou

(10) Patent No.: US 9,071,536 B2
(45) Date of Patent: Jun. 30, 2015

(54) BUS-BASED OPTICAL NETWORK SYSTEM

(71) Applicant: Rong-Nan Chiou, Tainan (TW)

(72) Inventor: Rong-Nan Chiou, Tainan (TW)

( * ) Notice: Subject to any disclaimer, the term of this patent is extended or adjusted under 35 U.S.C. 154(b) by 0 days.

(21) Appl. No.: 14/207,947

(22) Filed: Mar. 13, 2014

(65) Prior Publication Data
US 2014/0193151 A1    Jul. 10, 2014

Related U.S. Application Data

(63) Continuation-in-part of application No. 12/775,790, filed on May 7, 2010, now abandoned.

(51) Int. Cl.
| | |
|---|---|
| *H04J 14/08* | (2006.01) |
| *H04L 12/801* | (2013.01) |
| *H04L 12/403* | (2006.01) |
| *H04B 10/278* | (2013.01) |
| *H04Q 11/00* | (2006.01) |
| *H04B 10/00* | (2013.01) |

(52) U.S. Cl.
CPC ............ *H04L 47/15* (2013.01); *H04L 12/4035* (2013.01); *H04B 10/278* (2013.01); *H04Q 11/0067* (2013.01); *H04Q 2011/0064* (2013.01); *H04Q 2011/0092* (2013.01); *H04Q 2011/0094* (2013.01); *H04Q 2011/0096* (2013.01)

(58) Field of Classification Search
CPC ...... H04B 10/278; H04J 14/08; H04J 14/086; H04Q 11/0067; H04Q 2011/0064
USPC .......................................................... 398/99
See application file for complete search history.

(56) References Cited

U.S. PATENT DOCUMENTS

2011/0044685 A1*   2/2011   Ota et al. ................... 398/15
2011/0274428 A1*  11/2011   Chiou .......................... 398/60

* cited by examiner

*Primary Examiner* — Daniel Dobson
(74) *Attorney, Agent, or Firm* — Rosenberg, Klein & Lee

(57) ABSTRACT

A bus-based optical network system comprising optical fibers, optical line terminals (OLTs), and a plurality of optical network units (ONUs) is revealed. The OLT consists of the near part (OLTN) and the far part (OLTF). Optical fibers respectively form the transmitting and receiver buses (T Bus and R Bus) with the technique of time-division multiple access (TDMA). The slot flows on both buses are in opposite directions. The OLTN performing traffic control is situated in or near a central office (CO) while the OLTF is far from the CO. ONUs, whose MAC performs traffic control, connect with two buses and share their bandwidth. The MAC with traffic control keeps the performance of the network from degradation. The required numbers of COs and optical fibers for establishing the bus-based network are so smaller that the cost of the network can be significantly reduced.

3 Claims, 5 Drawing Sheets

BUS-BASED OPTICAL NETWORK SYSTEM

REFERENCE TO RELATED APPLICATION

This Application is being filed as a Continuation-in-Part of patent application Ser. No. 12/775,790, filed 7 May 2010, currently pending.

BACKGROUND OF THE INVENTION

1. Fields of the Invention

The present invention relates to a bus-based optical network system, especially to an optical network system in which the medium access of the network meets the requirement of "ideal fair behavior". The ideal fair behavior indicates that the medium access of the optical network units (ONUs) is not affected by the network topology as well as the position of ONUs. Moreover, the number of central offices (COs) and the amount of optical fibers are both small so that the construction cost and maintenance cost can be dramatically reduced.

2. Descriptions of Related Art

In recent years, the required index of bandwidth for public access networks is increased due to bandwidth requirements for various communication services. In conventional access networks, the provided bandwidth and transmissible distance are restricted by the characteristics of twisted-pairs. Thus network operators are dedicated to promoting the implementation and usage of FTTH (fiber-to-the-home) access networks. And the FTTH access networks are growing in several areas. Yet the high installation and maintenance cost is a barrier for globalization of FTTH networks. Thus how to reduce installation and maintenance cost while the communication quality can be assured is an important issue for the promotion of the FTTH access networks.

The public access network can be considered as a bridge between the backbone network and its users. A wider bridge can carry higher traffic. The capacity of optical fibers is much larger than that of twisted pairs. The bandwidth which a single user requires is so little that the capacity of an optical fiber can be shared by a plurality of users. Thus in the establishment of FTTH networks, to reduce cost by sharing media is feasible. In order to provide a medium-sharing environment, a plurality of multiple-access structures is proposed for constructing FTTH networks. These multiple-access structures can be divided into two groups according to the number of optical network units (ONUs) connected with a set of optical fibers. In the first group, each set of optical fibers is connected with an ONU while each set of optical fibers is connected with several ONUs in the second group. The network topology of the second group is a ring, as shown in FIG. 2, the end of the ring fibers is connected with an optical line terminal (OLT) situated at a central office (CO). The OLT includes two transmitters and two receivers. One set of the transmitter and the receiver generates upstream slots while the other set generates downstream slots. Directions of the upstream and the downstream slot flows are opposite to each other. On the other hand, the first group is further divided into two subgroups, i.e. a star topology and a tree topology as shown in FIGS. 3 and 4 respectively, according to the existence of splitters or passive fiber branching points. In the star topology, there is one central node, i.e. a CO, connected with ONUs by radial optical fibers. In the tree topology, splitters or passive fiber branching points are sub-centers and optical fibers branch out from the sub-centers to connect with ONUs. Moreover, there is an optical-fiber link between the OLT and the sub-center. The link comprises upstream and downstream channels.

The FTTH network of the first group requires large amount of optical fibers due to low bandwidth utilization efficiency. Thus high cost is required to install the FTTH network of the first group. As to the ring FTTH network, its bandwidth utilization efficiency is so high that the required amount of optical fibers is much less than star or tree FTTH networks. Thus the constructional cost paid for optical fibers can be reduced. However, in the ring FTTH network, the distance between a CO and its farthest ONU is shorter than that of star or tree FTTH networks. This leads to increase the number of COs. The more the number of COs, the larger the cost paid for constructing COs. From the perspective of constructional cost to compare ring topology with star or tree topology, the reduced cost due to fewer optical fibers for ring topology is used to compensate the increased cost according to the addition of COs. On the other hand, the cost due to fewer COs for star or tree topology is used to compensate the additional cost according to the largely increased amount of optical fibers. Furthermore, the maintenance cost of the FTTH network is related to the amount of optical fibers. The FTTH network with large amount of optical fibers not only complicates the distribution of optical fibers but also increases the difficulty in optical-fiber management and maintenance. This results in higher FTTH maintenance cost. Thus if both the number of COs and the number of optical fibers can be simultaneously reduced, not only the FTTH construction cost but also the FTTH maintenance cost will be lowered.

In most FTTH medium-sharing environments, time-division multiple access (TDMA) is used on the upstream channel while time-division multiplexing (TDM) is used on the downstream channel. In the downstream channel, besides a few control and maintenance messages from OLTs, most messages are the responses to communicative services initiated by network users. Although TDM can distribute bandwidth evenly, the channel capacity is not utilized efficiently. Moreover, the traffic responded to services initiated by a network user varies with the services. Yet the TDM technique is unable to distribute bandwidth according to various services. As to the upstream channel, all ONUs connected with an OLT are senders. The TDMA system provides the bandwidth requested by customer premise equipments (CPEs) attached to ONUs. Under TDMA operations, if some ONUs initiate when the network is with heavy load, these ONUs are unable to get the requested bandwidth in time and need to wait for a period. Otherwise, in order to reduce constructional cost, the number of ONUs must be increased. As the number of ONUs is increased, the duration of heavy-load state will be extended. Thus the period that an ONU waits for requested bandwidth will also be extended.

On the other hand, a mechanism, such as usage parameter control (UPC) that executes control functions including connection admission control, resource management, and priority control etc. on the backbone network, rejects partial traffic of an ONU which exceeds the maximum traffic agreed by commercial contract. This leads to the retransmission of the rejected traffic between the backbone network and the ONU. The continuously repeated retransmission occupies a certain amount of bandwidth on the upstream channel. The useless occupation not only reduces the throughput of ONUs but also increases heavy-load duration. Under the vicious circle, the waiting time of messages in ONUs will be lengthened. However, in order to reduce costs, the number of ONUs connected with an OLT must be increased. Hence, the heavy-load state will occur at high frequency and the heavy-load duration keeps increasing. Thus to reduce constructional cost will result in the dramatic degradation of the network performance. The performance represents the average waiting time of an ONU. The average waiting time of an ONU is the average duration that data segments wait in the first buffer of the ONU queue for an available slot on bus.

Refer to U.S. Pat. No. 6,504,853, the basic topology of a DTM network is a bus connecting all nodes but can also by realized by any other kind of structure, e.g., a ring structure (Row 56-57 Column 1). DTM is a circuit switched network and intended to be used in public networks as well as in local area networks (LAN's) (Row 26-28 Column 1). This patent mainly uses a technique provided for reallocating slots used for transferring data between nodes (Abstract). This prior art relates to a transmission system, not a transmission system. The network is suitable for short distance and small area (such as CO). A lot of nodes are densely deployed in the network for exchange. Thus while designing the network structure and the components used, problems of long distance network such as optical dispersion and energy loss are not considered. On the other hand, FTTH access network is used within a large area such as a city, a county, a town, etc. It reaches each node with the area, such as each users' home. That means nodes are connected from house to house. The messages received and transmitted by each node are transmitted by the FTTH access network but no message exchange occurs between nodes. Thus while dealing with the design of the network structure and the components used, problems of long distance network such as optical dispersion and energy loss should be considered here. In order to prevent interference caused by reflection of the signals and improve quality of signals received, slot terminators are used to avoid reflection of optical signals. In the U.S. Pat. No. 6,504,853, no slot terminator is mentioned. Thus it is unable to be applied to FTTH access network.

In the Row 15 Column 2, it is mentioned that the majority of the slots in a cycle are data slots. Access to data slots changes over time, according to traffic demands. Write access to slots is controlled by slot access, sometimes referred to as slot tokens. A node controller may write data into a specific slot only if the node has write access to this specific slot. The slot access protocol, or token protocol, guarantees the slot access to be conflict free, which means that several nodes do not write into the same slot.

The network uses slot access protocol such as token protocol to ensure no conflict of the slot access. Thus the network is a token network, not a TDMA network. Refer to R. M. Newman, and J. L. Hullet, "Distributed queueing: A fast and efficient packet access protocol for QPSX," in New Communication Services: A Challenge to Computer Technology, P. Kiihn (Ed.), North-Holland, pp. 294-299, 1986, it is learned that packet delay of the token network is more often than that of the TDMA network. This means the performance of the network in the U.S. Pat. No. 6,504,853 is much lower than the TDMA network.

Moreover, refer to the Row 33 Column 3 of the U.S. Pat. No. 6,504,853, the transfer of slot ownership is initiated by a request from the node having a lack of slot capacity. Such a request, or any other type of reallocation initiation, may for example be provided when the node has borrowed slots a predefined number of times, when the ratio between the number of slots having the node as temporary home node and the number of slots having the node as primary home node exceeds a predefined value, when the allocation or "loan" has to be directed over a substantial distance over the network. As another alternative, a predefined fraction or a predefined number of slots may be arranged to change owner.

In U.S. Pat. No. 6,504,853, "borrow and loan" initiated by various requests is used to regulate write access to time slots between system nodes. Thus data in the node of the bus-based optical network system is unable to be written into another empty time slot directly according to business contract engaged between network managers and clients. The execution of each node can't satisfy requirements of contents of the business contract.

Refer to U.S. Pat. No. 4,630,256, a bidirectional dual network is revealed. In accordance with the invention, two channels operated in opposite directions are established on one optical fiber. The network is constructed based on Wavelength Division Multiplexing (WDM). Thus the bandwidth of each sub-network is reduced and the speed is decreased, much more lower than the system having only one channel per one optical fiber. The quality of optical signals is also getting worse and the propagation distance is shortened. Thus the network is applied to small area such as private network in a building or between adjacent buildings. From the point of view of the data transmission, the network is neither applicable to the medium and long distance communication (such as network across the city or town), nor to the public networks because that construction and maintenance cost of FTTH network is affect by distribution range of the network lines.

Refer to U.S. Pat. No. 7,639,694, a centralized control network is used in the system. Due to centralized control and distribution of access of slots of the TDMA system, the centralized control mechanism assigns the number of slots allowed and positions of these slots to the node that delivered a request for sending messages. Thus while the node in the centralized control system sending messages, it first sends a "sending request message" and then waits for "permitting to send messages" (messages that permit the node to send messages). The content of the permitting to send messages includes the number of slots allowed and positions of the slots. The "sending request message" and the "permitting to send messages" are collectively called control messages. The control messages are transmitted by specific control slots. That means the control messages share a part of bandwidth.

SUMMARY OF THE INVENTION

An average waiting time (waiting mean) of an ONU can be used to represent the access of the ONU. The shorter the waiting mean of an ONU, the higher the access of the ONU. In a high-speed TDMA network, the waiting mean of an ONU is inversely proportional to the traffic of the ONU regardless of network topology. Based on the comprehension, it is deduced that once the medium access control protocol (MAC) of an ONU is implemented with traffic-control methods, the network will be inherent in "ideal fair behavior". The "ideal fair behavior" means that the waiting mean of an ONU doesn't vary with its relative position in the network as its traffic is not changed. On the other hand, traffic control is an important process for commercial public networks. For commercial behavior, customers pay for required bandwidth. The more the required bandwidth, the higher the payment. If the traffic transmitted by an ONU can be controlled according to the commercial contract, the retransmission caused by UPC will occur no more. Thus the capacity of TDMA channels can be efficiently distributed among all ONUs. Moreover, when a traffic-control method is used to distribute the medium access to each ONU, the communicative performance of the network will not degrade even if the network is with full load. Therefore, traffic control is adopted in the presented optical network to distribute access among ONUs so as to increase the number of ONUs and reduce the constructional cost. At the same time, the communicative performance is not affected by the reduction of cost.

Based on the above description, it is a primary object of the present invention to provide a network system that is constructed by optical fibers and is based on bus topology. Optical fibers are regarded as upstream and downstream buses respectively. The medium-sharing environment established on buses is by the TDMA technique. The capacity of optical fibers is shared by all ONUs and their corresponding queues that are within OLTs. All ONUs share the capacity of upstream channels and their corresponding queues in OLTs share the capacity of downstream channels. As to the MAC of ONUs and OLTs, traffic-control methods are used to control the access of TDMA slots. Due to the bus topology, the distance between a CO and the farthest ONU attached to the CO is much longer than that of the ring FTTH network. At the same time, the amount of optical fibers constructing the present optical network is much less than that constructing star/tree FTTH networks. Thus the number of COs and the amount of optical fibers required for constructing the present optical network are greatly reduced simultaneously. Therefore, the constructional and maintenance cost of the present optical network can be significantly reduced. Furthermore, traffic-control methods are applied to control medium access, the network of the present invention can not only properly distribute transmission capacity among ONUs but also provide good communicative quality even if the network is at full-load state.

The present invention focuses on that in the MAC of each node, the access of the slot is controlled by the way of traffic control. The so-called traffic control means the control of maximum traffic each node could transmit. That means the write access to slots at each node is not limited by positions of the slots. Thus the access to the slots in the present invention is much freer than others. At each node, empty accessible slots can be used for write operation. Due to such freedom, the access to the slots in the system is distributed into and executed by each node. There is no need to use a centralized control mechanism. Moreover, the control messages of the "sending request message" and the "permitting to send messages" are also not required for reserving bandwidth the access required. Thus it is not necessary to reserve control slots in the frame. This is a real high efficient TDMA transmission system. No control messages of the "sending request message" and the "permitting to send messages" are required so that the management and exchange of messages between the centralized control mechanism (such as OLT) and related nodes are also not required. Thus multi-point control protocol (MPCP) is also not necessary.

Except a part of bandwidth being reserved for slots used in control and maintenance of CO, the bandwidth of the TDMA system is used by each node respectively according to the node's needs. Thus a payload ratio of the system is increased. For operators of business networks, the cost is decreased. The messages transmitted in the network are controlled by a CO switch directly to complete communication procedures. Thus users only need to wait empty slots on the bus, no any other time for control operation required. Thus the FTTH network of the present invention is transparent for users. The users do not feel the existence of the FTTH network of the present invention. Moreover, the optical fiber provides high signal quality. Thus initiation time of communication is significantly reduced. The network is more user-friendly.

The present invention is a bus-based optical network system in which time-division multiple access (TDMA) is used on both upstream and downstream channels for access network transmission. The main function of the network system is to transmit user's messages to a backbone network via CO and receive messages from CO, not like exchange between nodes of the TDM bus network. Moreover, in the FTTH network of the present invention, each node can get access to one empty slot of the TDMA system because the access is determined by MAC of each node. The upstream and downstream channels, both using TDMA, don't have waste of unused slots caused by assignment. Due to the FTTH network with distributed access and no control messages of the "sending request message" and the "permitting to send messages" required and transmitted, there is no wasted time waiting for the "permitting to send messages" from a bandwidth allocation mechanism in the centralized control system. Once there is an empty slot, each node can determine to get access or not by itself. Thus the bandwidth utilization efficiency is improved.

In the bus-based optical network system of the present invention, "borrow and loan" and related requests are unnecessary. The nodes in the bus-based optical network system can write data into any empty slot according to commercial contract signed by network managers and clients, without requests and borrow/loan. Based on such simple control way, execution of each node satisfies requirements of contents of the commercial contract. The bandwidth utilization of the bus-based optical network system of the present invention is dramatically improved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
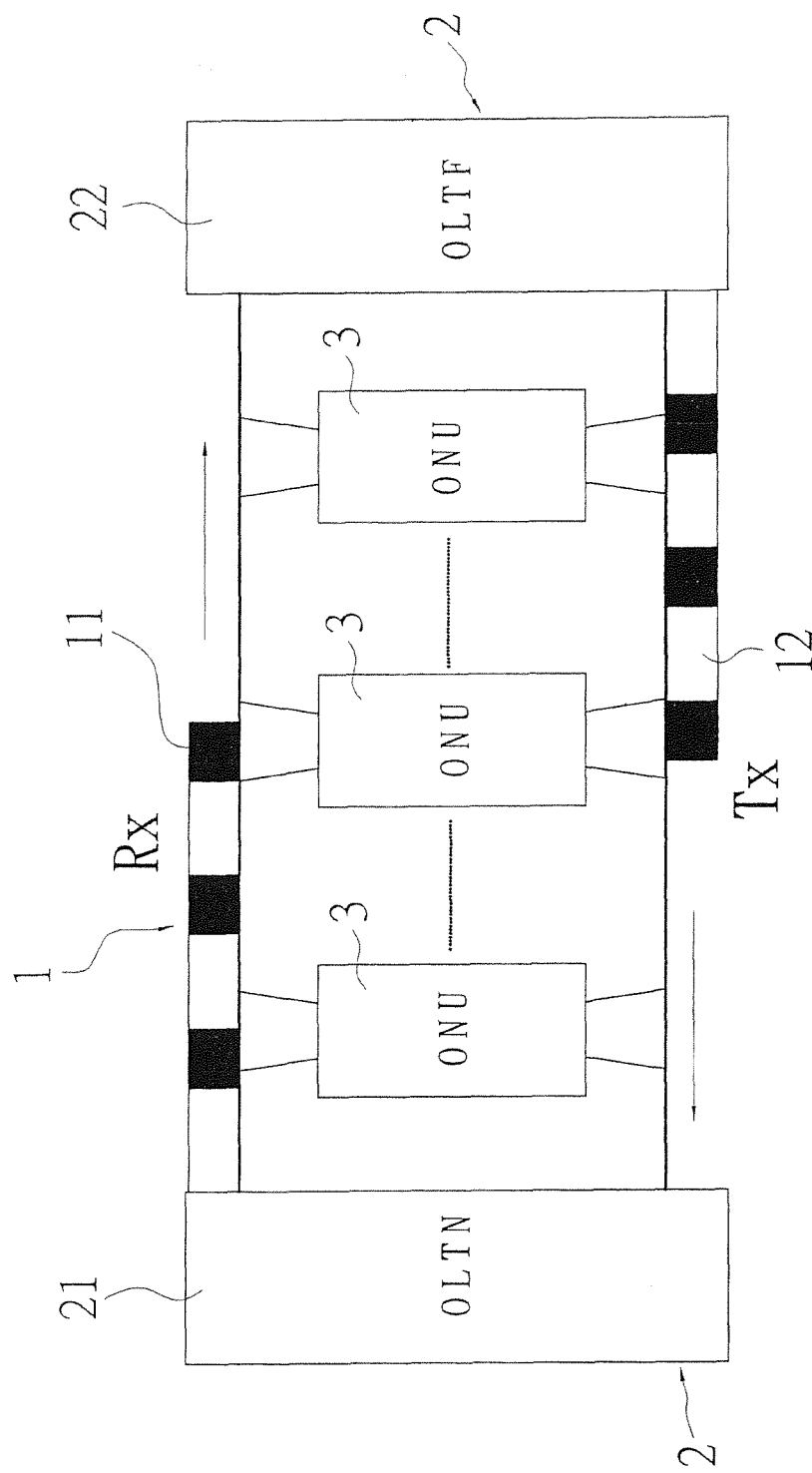
FIG. 1 is a schematic drawing showing the structure of an embodiment of a bus-based optical network system according to the presented invention.
Figure 2:
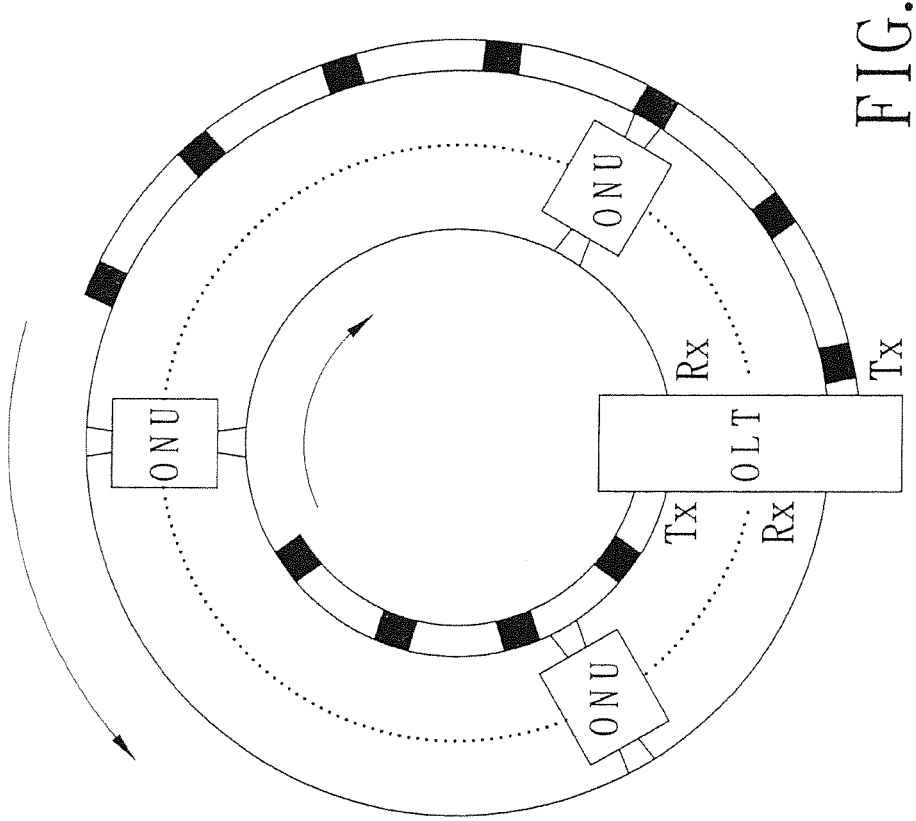
FIG. 2 is a schematic drawing showing the structure of an embodiment of a FTTH network based on a ring topology available now.
Figure 3:
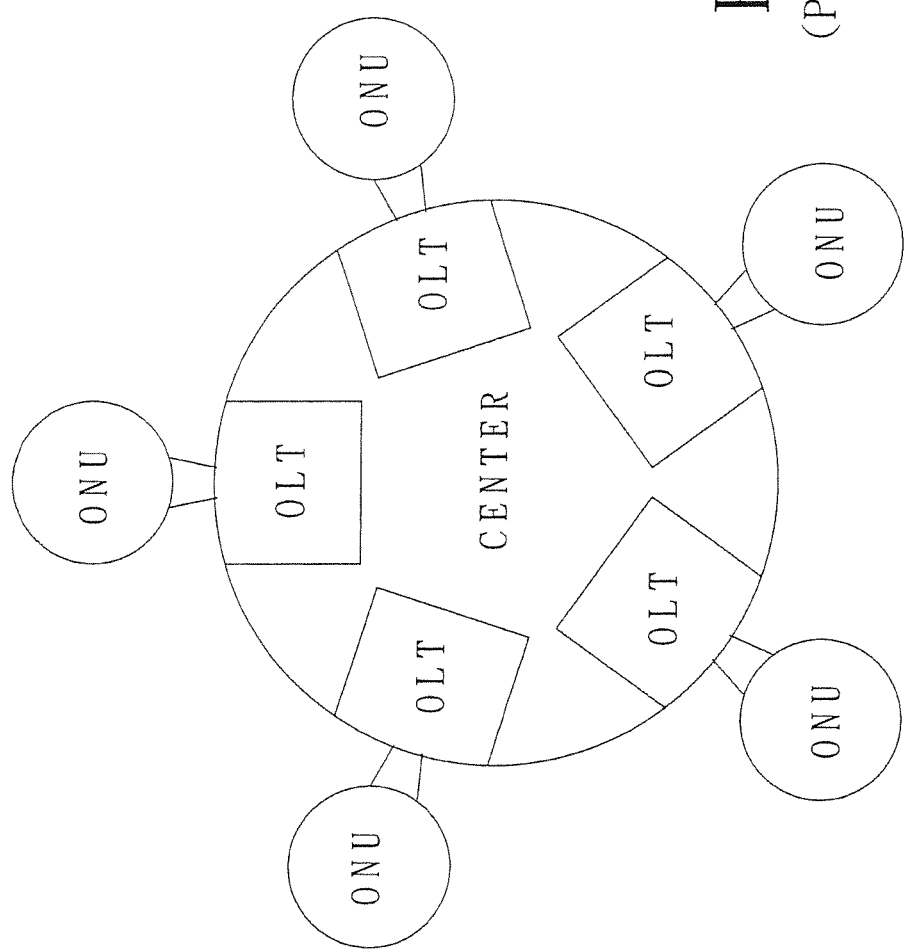
FIG. 3 is a schematic drawing showing structure of an embodiment of a FTTH network based on a star topology available now.
Figure 4:
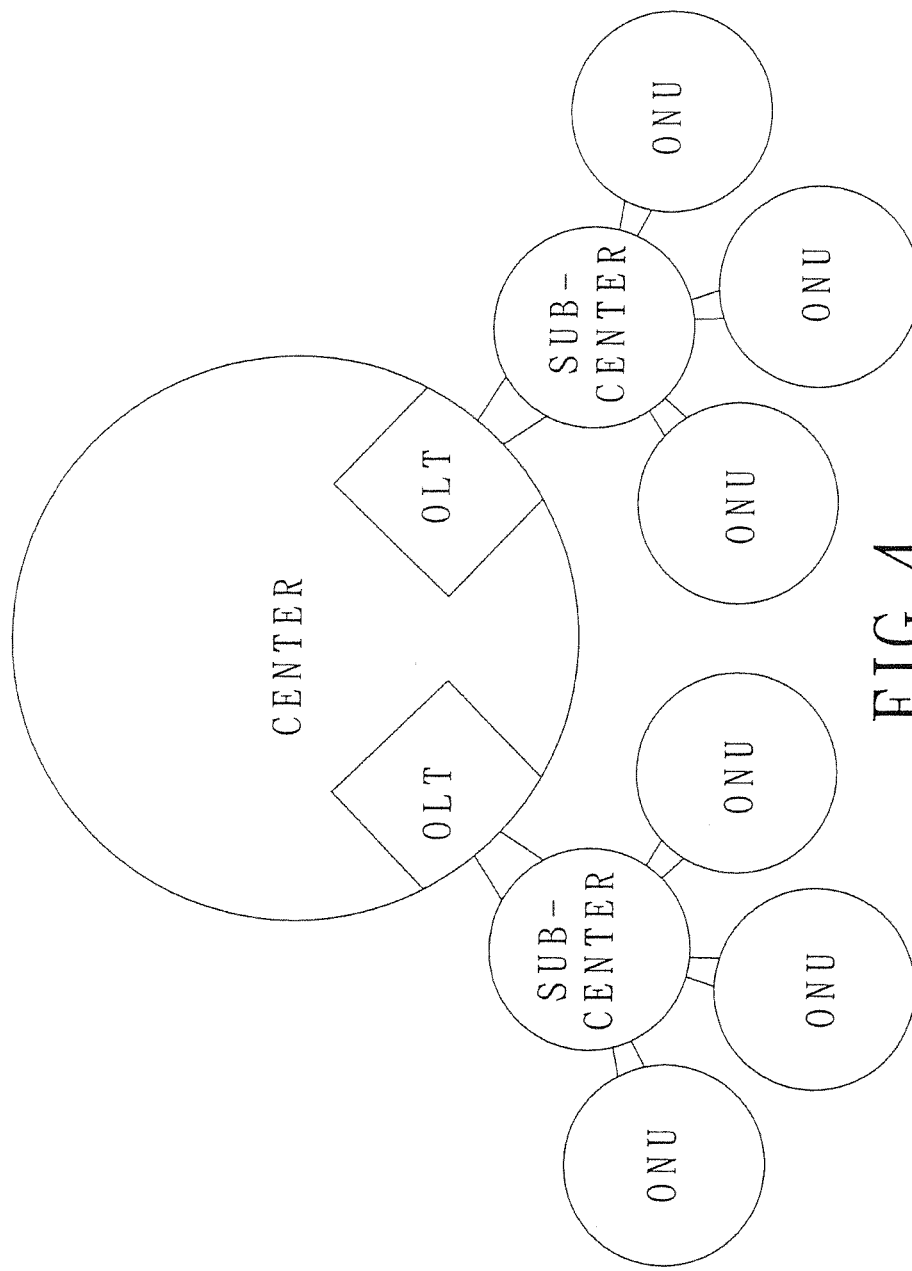
FIG. 4 is a schematic drawing showing structure of an embodiment of a FTTH network based on a tree topology available now.

Refer to FIG. 1, a schematic drawing showing structure of a bus-based optical network system of the present invention is revealed. The optical network system includes optical fibers 1, optical line terminals (OLTs) 2, and a plurality of optical network units (ONUs) 3.

One of optical fibers 1 is a transmitting bus (T Bus) 12 and the other is a receiving bus (R Bus) 11. The T Bus 12 is an upstream channel while the R Bus 11 is a downstream channel.

The optical line terminal (OLT) 2 consists of two parts. One part is arranged in or near central offices (COs) and is called the near part of an optical line terminal (OLTN) 21 while the other part terminates the optical fiber 1 at the position far away from the central office (CO) and is called the far part of an optical line terminal (OLTF) 22. Both the OLTN 21 and the OLTF 22 include a slot generator and a slot terminator. The flow of TDMA slots on the R Bus 11 is sent by the slot generator of the OLTN 21 and sinks into the slot terminator of the OLTF 22 while the flow of TDMA slots on the T Bus 12 is sent by the slot generator of the OLTF 22 and sinks into the slot terminator of the OLTN 21. Moreover, the OLTN 21 is used to transfer signals between the presented network and the backbone network.

The plurality of optical network units (ONUs) 3 connects between the T Bus 12 and the R Bus 11 and works as an interface between the present network and private networks. The private networks include various kinds of customer premise equipments (CPEs). The CPEs and their interfaces can be directly connected with ONUs 3 or indirectly connected with ONUs 3 through wireless networks, coaxial networks, or various local area networks etc. The medium access control (MAC) protocol of each ONU 3 provides and performs traffic control functions solely within each of said plurality of ONUs 3 independent of said optical line terminals 2 when the ONU 3 sends data segments onto the transmitting bus 12. Moreover, the maximum traffic of each ONU 3 can be restricted and this maximum traffic can be used as a traffic-control parameter of each ONU 3 that can vary with the maximum traffic agreed by commercial contracts. Similarly, the maximum traffic sent from the OLTN 21 to an ONU 3 can also be considered as a traffic-control parameter that also can vary with the maximum traffic agreed by commercial contracts.

In order to send messages to ONUs 3, there is a plurality of queues in the OLTN 21 and every queue corresponds to an ONU 3. The corresponding queue of each ONU 3 is used to temporarily save messages destined for the ONU 3. Although the OLTN 21 is the only equipment that sends messages to ONUs 3, the queues in the OLTN 21 are the true components that share bandwidth of the R Bus 11. Thus all queues within OLTNs 21 compete with one another for TDMA slots on the R Bus 11. In order to fairly and logically distribute the access of the R Bus 11 among these queues, the mechanism of the OLTN 21 that executes traffic control must be initiated when messages in queues are going to be written into slots on the R Bus. The allowed maximum traffic of a queue depends on the commercial contract of the customer attached to the corresponding ONU 3 of the queue and network managers. Therefore, the present optical network can flexibly satisfy clients' requirements on bandwidth.

The present invention uses the bus topology so that the distance between the CO and the farthest ONU in a FTTH network is longer than that in a ring-based FTTH network. Thus the service area covered by the CO of the bus-based optical network is much larger than that of the ring-based FTTH network. Both the amount of optical fibers and the number of COs are significantly reduced. The cost of the present network can be dramatically reduced. Moreover, the medium access is distributed by the MAC with traffic control. Thus the access of the T and R Buses can be logically and effectively distributed among all ONUs and their corresponding queues in the OLTN, respectively. Consequently, even if the present network is with full load, users can still have good communicative quality.

Figure 5:
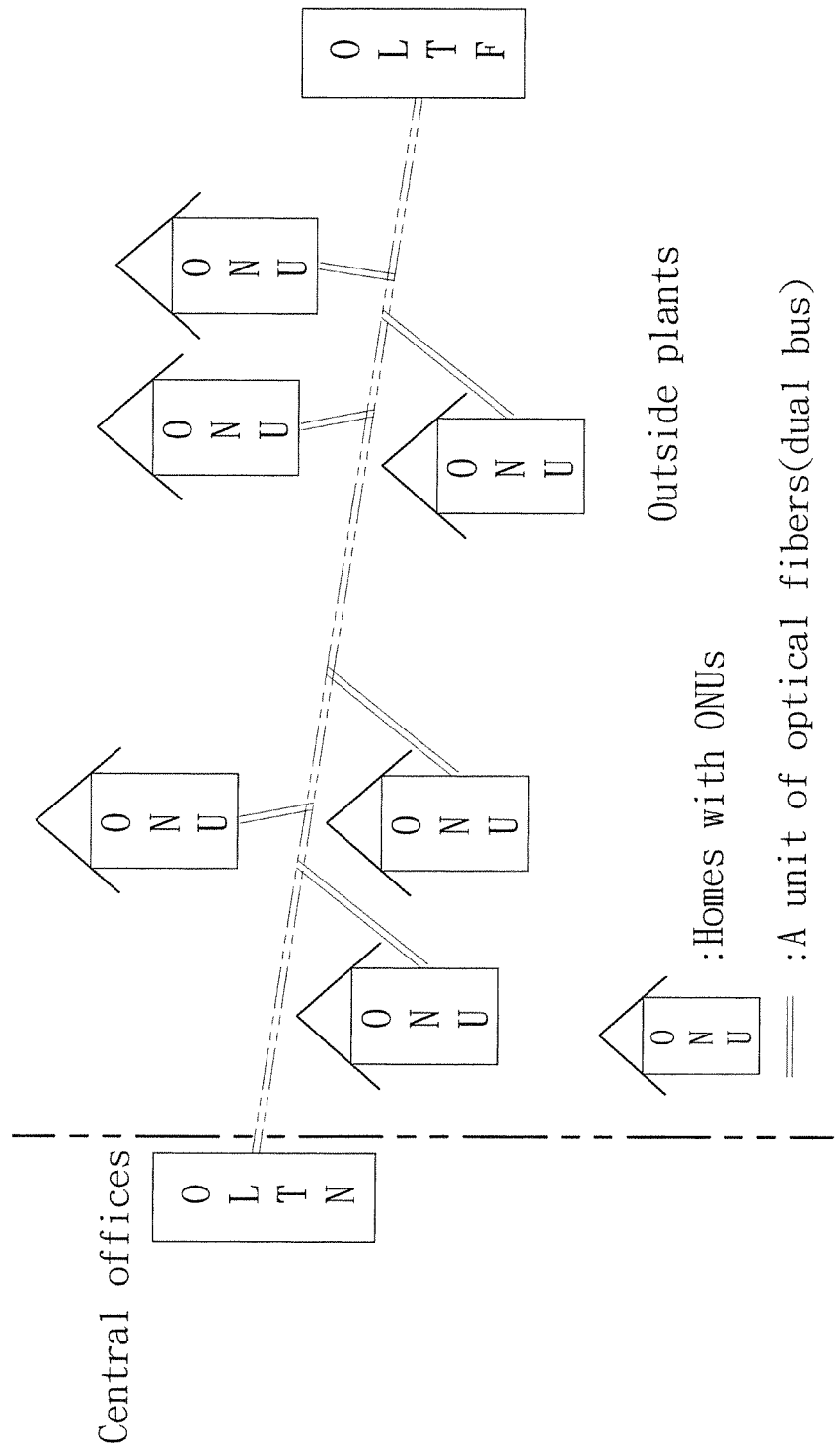
FIG. 5 is a schematic drawing showing structure of dual-bus TDMA FTTH access networks according to the presented invention.

As shown in FIG. 5, a schematic drawing showing structure of Dual-Bus TDMA FTTH access networks is revealed. The time-division multiple access (TDMA) is used on both the upstream and downstream channels. It is obvious that the optical network units (ONU) of all users are directly connected to dual buses of TDMA, without passing through any mediation device. And a distributed access control architecture is shown. That means each ONU controls its access respectively. Thus there is no delay caused by the control (like the centralized control system). The bandwidth utilization efficiency is further improved. In the figure, OLTN (the OLT part Near COs) and OLTF (The OLT part Far from COs) are used to generate TDMA slot flows on two buses. In the OLTN and OLTF, there are slot generators and slot terminators respectively corresponding to the two buses. Thus the operation of the two buses is independent from each other. Moreover, OLTN is a signal input/output interface between the FTTH access network and a public backbone network. Messages from ONU are forwarded to CO via OLTN and then sent to a receiver connected to the backbone network. Messages of the backbone network are also delivered to each ONU via OLTN. For transmitting messages to each ONU, there is a queue corresponding to each ONU in OLTN. Each queue is used to temporarily store messages destined for the ONU and control access of OLTN to bandwidth of downstream bus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A bus-based optical network system comprising:
   optical fibers forming a transmitting bus and a receiving bus using time-division multiple access (TDMA) method; the transmitting bus defining an upstream channel and the receiving bus defining a downstream channel;
   optical line terminals including a near part of an optical line terminal (OLTN) and a far part of an optical line terminal (OLTF); said optical line terminals configured for transmitting and receiving TDMA messages; the OLTN being arranged in or near a central office (CO), and the OLTF terminating said optical fibers at a position far from the CO; each of said OLTN and said OLTF including a TDMA slot generator and a TDMA slot terminator;
   a medium access control protocol (MAC) of the OLTN includes a traffic control function; the position far from the CO is another central office or a position that is reached by optical fibers outside the central office of the bus-based optical fibers; and
   a plurality of optical network units (ONUs) each connected with the transmitting bus and the receiving bus, said plurality of optical network units being used as an interface between the bus-based optical network system and private networks; the medium access control (MAC) protocol of each ONU providing and performing traffic control functions solely within each of said plurality of ONUs independent of said optical line terminals when the ONU sends data segments onto the transmitting bus.

2. The device as claimed in claim 1, wherein private networks include various kinds of customer premise equipments (CPEs) while the CPEs and their interfaces are directly connected with ONUs or indirectly connected with ONUs through wireless networks, coaxial networks, or local area networks.

3. The device as claimed in claim 1, wherein maximum traffic of each ONU is restricted and the maximum traffic is used as a traffic-control parameter, which is applied by the MAC of each ONU, that varies with the maximum traffic promised by a commercial contract; the maximum traffic sent from the OLTN to each ONU is also regarded as a traffic-control parameter, which is used by the MAC of the OLTN, that varies with the maximum traffic promised by a commercial contract.

* * * * *